Nov. 29, 1927.  1,651,186
J. CLARK ET AL
WROUGHT METAL CONNECTION FOR THREADED PIPES
Original Filed March 4, 1924   2 Sheets-Sheet 1
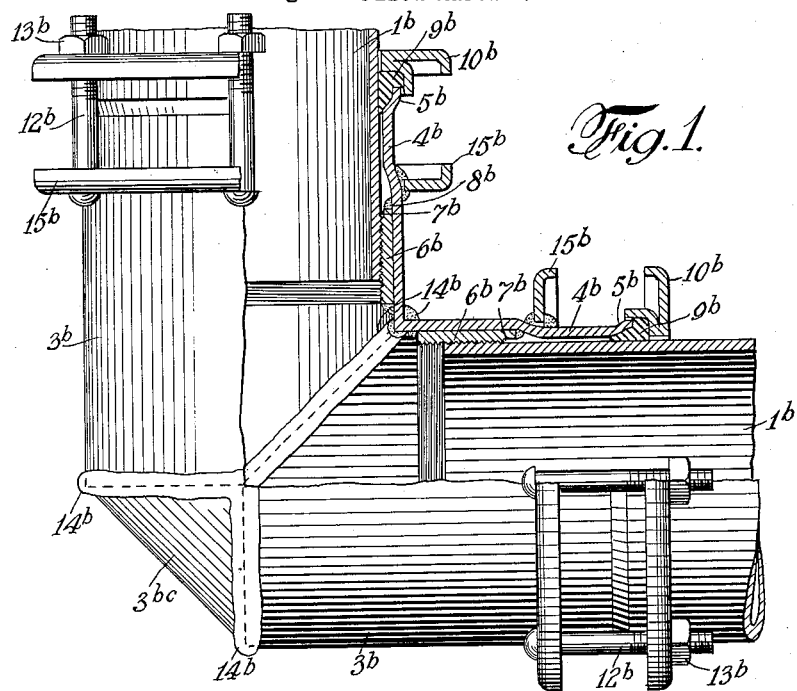
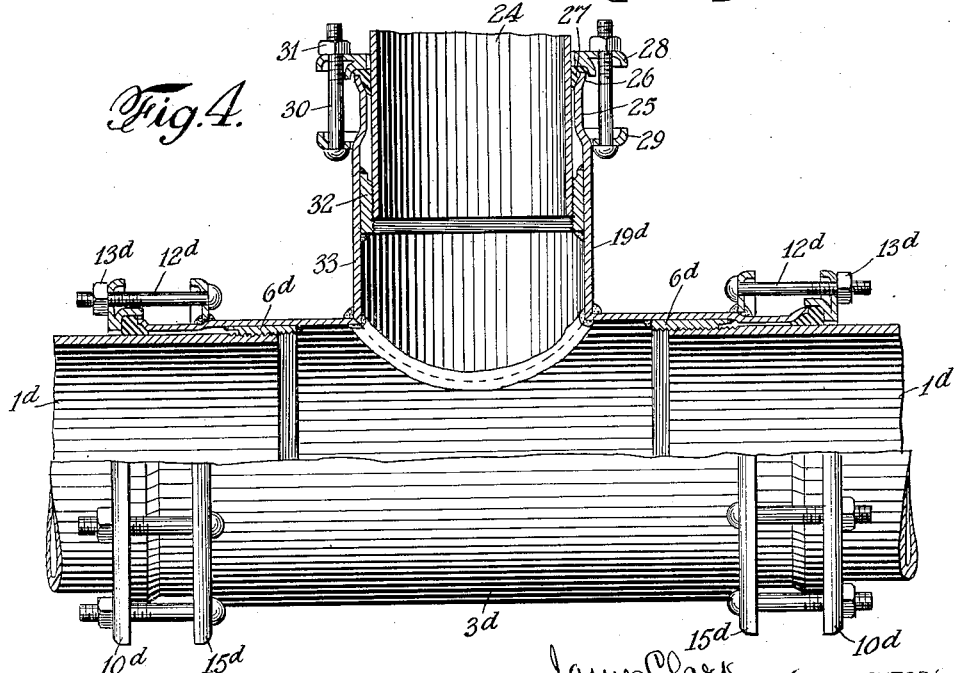

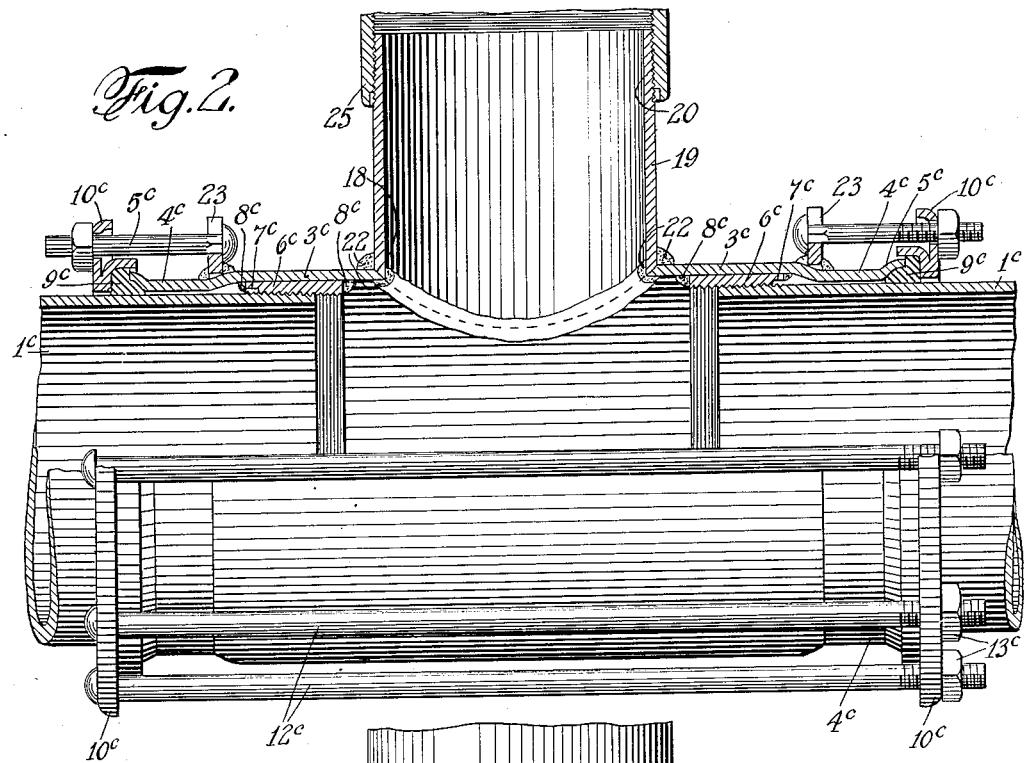
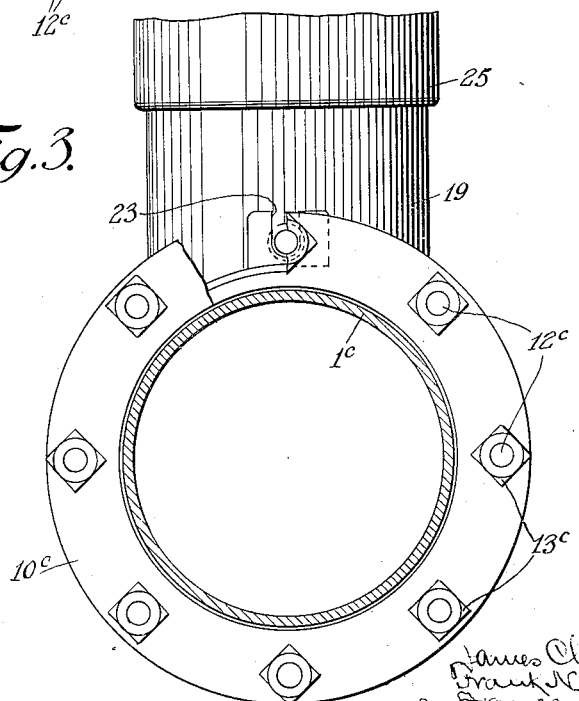

Patented Nov. 29, 1927.

1,651,186

UNITED STATES PATENT OFFICE.

JAMES CLARK, FRANK N. SMITH, AND JAMES MEESE, OF BRADFORD, PENNSYLVANIA, ASSIGNORS TO S. R. DRESSER MANUFACTURING COMPANY, OF BRADFORD, PENNSYLVANIA, A CORPORATION OF PENNSYLVANIA.

WROUGHT-METAL CONNECTION FOR THREADED PIPES.

Original application filed March 4, 1924, Serial No. 696,811. Divided and this application filed August 12, 1926. Serial No. 128,768.

Our invention consists in the novel features hereinafter described, reference being had to the accompanying drawings which show several embodiments of our invention selected by us for purposes of illustration, and the said invention is fully disclosed in the following description and claims.

This application is a division of our former application for Letters Patent of the United States, filed March 4, 1924, and given Serial No. 696,811.

The object of our invention is to provide a reinforcing sleeve or connection for threaded end pipe sections for use especially in rivers, swamps, and bad places in pipe lines, for the purpose of relieving the screw threads from injurious strain, and for the purpose of insuring an absolutely tight joint, and obviating the necessity of future repairs to the pipe line, which might otherwise be required in case of injury to the screw threaded connection.

Our invention also contemplates the use of our improved forms of couplings, where the connected pipes are disposed angularly with respect to each other, and also in cases where it is desirable to effect a connection with a branch pipe or pipe line.

Referring to the accompanying drawings,

Fig. 1 is an elevation partly in section showing one embodiment of our invention, in which the sleeve or connection is formed so as to provide portions disposed angularly with respect to each other.

Fig. 2 is a similar view of a modification of our invention, in which the sleeve or connection is provided with a branch member having its end exteriorly threaded, to enable a threaded pipe section to be connected thereto by an ordinary pipe collar.

Fig. 3 is an end view of the connection illustrated in Fig. 2.

Fig. 4 is a view similar to Fig. 2, showing a modification of our invention in which the sleeve is provided with a lateral branch, the end portions of which are formed similarly to the end portions of the sleeve.

Referring to Fig. 1 of the drawing, $1^b$, $1^b$, represent two ordinary threaded end pipe sections which are to be united, in this instance at an angle to each other, and form part of a pipe line such as is used for conveying natural gas or other fluid. In this figure we have shown the coupling or connection arranged to connect pipe sections having their axes disposed perpendicularly to each other, but they may be united at any desired angle. In the formation of the threaded end portions on pipe sections of this type, the threads are cut by means of dies or tools, portions of the metal being removed so that the end portions of the pipe sections are necessarily weakened, and when connected by the ordinary connections they frequently fracture at one of the grooves between adjacent screw threads outside of the connecting device, especially where the pipe sections are subjected to lateral strains. Such fractures of the threaded ends of the pipe sections, or the splitting or breaking of the usual connecting devices would naturally render the coupling useless, with the result that leaks occur which are difficult and expensive to repair. Where pipe lines are laid in river beds, swamp land, and other localities where the pipe joints are very inaccessible, and where the pipe lines are subject to severe lateral stress due to the character of the soil in which they are laid, which may permit the line to sag and exert a bending strain on the connected pipe sections, and where through the heaving of the soil by frost, or in any other way, the pipe line is likely to be disturbed so as to produce lateral strains, the ordinary threaded pipe connections do not afford a permanent and reliable coupling for the threaded pipe sections, and it has been found necessary and extremely desirable to connect such pipe sections by means which will reinforce the threaded connections of the pipes so as to guard against fracture of the same or of the pipe connections, and also to provide means for insuring an absolutely tight joint even if such fractures should occur so as to avoid the loss, expense and labor which may otherwise be required for the replacing or repair of a broken pipe or connection.

In the carrying out of our invention we employ a long coupling sleeve of considerably greater length than the ordinary threaded connection, formed preferably of wrought metal, and preferably having its main body of cylindrical form and of considerably greater internal diameter than the external diameter of the pipe sections to be connected. Adjacent to each end the sleeve is provided with a reduced pipe engaging portion which substantially fits around the exterior of the unthreaded portion of the pipe section to be connected therewith certain clearance being allowed, sufficient to accommodate ordinary surface irregularities and variations in commercial pipe. Beyond the pipe engaging portions, the sleeve ends are flared outwardly to form annular flanges providing packing recesses between them and the exterior of the pipe sections. The sleeve is provided adjacent to each end with a separately formed internally threaded annular collar portion fitting the enlarged portion of the sleeve and permanently united thereto by welding, into which collar portions the threaded ends of adjacent pipe sections may be firmly screwed. Annular packings are placed in the packing recesses and compressed by means of clamping rings or followers, provided with clamping bolts and nuts which draw said clamping rings toward the ends of the sleeve, and form a fluid tight joint. It will thus be seen that the reduced pipe engaging end portions of the sleeve reinforce the pipes at a distance from the engagement of their threaded ends with the adjacent screw collar members within the sleeve, and relieve the threaded portions of the pipe section from strain, so that they are not as likely to break while the compressed packings insure a tight joint, even if the threaded portions of the pipe should break or leak.

In the form of our invention shown in Fig. 1, the coupling has its end portions arranged with their axes perpendicular to each other, and the sleeve is formed in this instance in three sections of wrought metal, $3^b$, $3^b$, $3^c$, suitably mitred, so that they can be fitted closely together, the said sections being united preferably by welding them on an electric welding machine, by the aid of a welding rod, and forming either upon the interior or exterior, or both, fillets, $14^b$, uniting the sections rigidly.

This angular sleeve is provided adjacent to each end with the reduced pipe engaging portion, $4^b$, a marginal packing engaging flange, $5^b$, packing ring, $9^b$, clamping ring, $10^b$, provided with bolt holes. An anchor flange indicated at $15^b$, provided with bolt holes to register with those in the clamping flange, $10^b$, is conveniently welded to each end portion of the sleeve on an electric welding machine with the use of a welding rod, and the formation of fillets on one or both faces of the anchor ring, and bolts, $12^b$, and nuts, $13^b$, connect each anchor ring with the adjacent clamping ring. Within each end portion, $3^b$, of the sleeve, within the portion of enlarged diameter thereof is an internally threaded collar section indicated at $6^b$, having its outer end internally recessed, as shown at $7^b$, and permanently united to the sleeve by welding, preferably on an electric welding machine with the aid of a welding rod, and by the formation of a fillet, $8^b$, at each end of these threaded collar sections. The recess of the outer end of the collar section, $6^b$, prevents the fillet adjacent thereto from interfering with the internal threading of the collar section, $6^b$. In use, each of the pipe sections, $1^b$, is inserted in one end of the sleeve and screwed into the adjacent internally threaded collar section, $6^b$, the pipe end being provided with the packing ring, $9^b$, and clamping ring, $10^b$. The bolts, $12^b$, are then passed through the registering apertures in the anchor rings, and the adjacent clamping rings and the nuts, $13^b$, are screwed up so as to compress the packing rings. It will be obvious that in case there is any leakage at the threaded connections between the pipes and the interior threaded collar members, the coupling will nevertheless be maintained absolutely tight by the packing rings, $9^b$, and their clamping rings. It is obvious that the sleeve member may be made in one piece and have its end portions in co-axial relation, as indicated in Figs. 3 and 4, with or without lateral branch members shown in those figures. In some instances it is desirable to take off a lateral branch pipe at an angle to the main line, and we have shown in Figs. 2 and 3 one construction for accomplishing this result. In these figures, $1^c$, $1^c$, represent the main line pipe sections to be connected. $3^c$ represents the sleeve member which is formed exactly as hereinbefore described and illustrated in Fig. 1, with the exception that it is formed in one piece with its end portions in axial alignment, and is in this instance provided at one side with an aperture indicated at 18, into which is fitted a branch member indicated at 19, which in this instance has its outer end externally threaded, as shown at 20, so that it can be readily connected by means of an ordinary screw collar, 21, with the next adjacent pipe section of the branch line. The branch member, 19, is fitted to the aperture, 18, and is secured to the sleeve, $3^c$, by welding preferably on an electric welding machine, and by the use of a welding rod, fillets, 22, being formed preferably both inside and outside of the joint, and rigidly uniting the branch member to the sleeve member. The central portion of the sleeve, $3^c$, is of larger diameter than the pipe engaging portions indicated at $4^c$, and within these portions of larger diameter adjacent to each end of the sleeve member is an internally threaded collar section, $6^c$, constructed in the same manner as previously described, with reference to Fig. 1, and welded to the sleeve, $3^c$, preferably on an electric welding machine by the use of a welding rod, and the formation of fillets, $8^c$. These collar sections, $6^c$, will preferably be provided at their outer ends with the internally recessed portions, 7ᶜ, as shown. The outer ends of the sleeve, 3ᶜ, are provided with the marginal packing engaging flanges, 5ᶜ, packings, 9ᶜ, clamping rings, 10ᶜ, all constructed and operating as hereinbefore described, the clamping flanges being provided with clamping bolts. It is obvious that the sleeve could be provided with long bolts directly connecting the clamping flanges at the opposite ends of the sleeve, or that the sleeve may be provided with anchor flanges adjacent to each end connected to the adjacent clamping flanges by short bolts, as indicated in Fig. 1. Where the long bolts, as indicated at 12ᶜ, are employed, it is obvious that it would be impossible to run such a bolt in line with the branch pipe, 19, and where it is desirable to have a bolt in this location in order to properly distribute the bolt strain around the circle of the clamping rings, 10ᶜ, we may provide the sleeve with one or more anchor lugs, 23, as indicated in Figs. 2 and 3, welded to the end portions of the sleeve, and provided each with a bolt hole or with an open slot of sufficient size to accommodate the bolt, and locate it in alignment with a bolt hole of the adjacent clamping ring, 10ᶜ. Obviously, if the sleeve is provided with an anchor ring at each end as shown in Fig. 1, these lugs would not be used.

In Fig. 4, we have shown a further modification of our invention, in which the sleeve indicated at 3ᵈ, is provided with a branch member, 19ᵈ, of larger internal diameter than the external diameter of the adjacent threaded branch pipe, 24, to be connected therewith, the outer end portion of the branch member being provided with a pipe engaging portion of reduced diameter, indicated at 25, and a marginal packing engaging flange, 26, to receive a packing, 27, surrounding the branch pipe section, 24, the packing ring, 27, being engaged by a clamping ring, 28, which is secured to an anchor ring (welded to the branch member, 19ᵈ) by means of short bolts, 30, and nuts, 31. The branch member, 19ᵈ, of the sleeve is provided within a portion thereof of greater internal diameter, with a threaded collar section 32, fitting and welded to the interior of the branch member (preferably by means of an electric welding machine, and the formation of fillets, 33) to receive the threaded end of the branch pipe, 24. The other portions of the sleeve, 3ᵈ, are constructed exactly as hereinbefore described and illustrated in Figs. 2 and 3, and are indicated by the same reference numerals with the addition of the letter "d" thereto, except that in Fig. 4, the sleeve is shown as provided with anchor flanges, 15ᵈ, and short bolts, 12ᵈ, and nuts, 13ᵈ, connecting each clamping ring, 10ᵈ, with the adjacent anchor flange. The pipe sections of the main pipe line indicated at 1ᵈ, are screwed into the collar sections of the sleeve indicated at 6ᵈ, and located on opposite sides of the branch pipe, while the compressed packings at the opposite ends of the sleeve, 3ᵈ, and at the outer end of the branch member, 19ᵈ, preclude the possibility of leakage in case of leaks at the screw threaded connections between the pipes, 1ᵈ, and the main sleeve, or between the branch line pipe, 24, and the branch member, 19ᵈ.

It will be understood that our improved pipe coupling is manufactured preferably entirely of wrought metal, so that all parts thereof are entirely free from cracks, porosities, sand holes, etc., which are often present in the construction of cast iron parts. By making our couplings of wrought metal, we are able to make them thinner and very much lighter than they would have to be if cast metal were employed, and we are also able to unite the separately formed parts by welding, and preferably by electric welding, and the use of a welding rod, whereby connecting fillets are formed and rigidly unite the several parts.

What we claim and desire to secure by Letters Patent is—

1. A wrought metal connection for threaded pipes comprising among its members, a wrought metal sleeve member provided adjacent to terminal portions thereof, with reduced pipe engaging portions substantially fitting the unthreaded portions of pipe sections to be connected therewith, and having marginal outwardly flared portions forming packing recesses to receive annular compressible packings, said sleeve member having portions of greater internal diameter adjacent to said pipe engaging portions, and being provided within said portions of greater internal diameter with separate, separately formed collar members of wrought metal fitting therein, welded thereto, and internally threaded to engage the threaded ends of said pipe sections, packing rings for engaging said marginal flared portions, clamping rings, and clamping bolts and nuts for said clamping rings.

2. A wrought metal connection for threaded pipes comprising among its members a sleeve having portions of greater internal diameter than the external diameter of the pipes to be connected, and having portions disposed angularly with respect to other portions thereof, said sleeve having at least one of its terminal portions provided with pipe engaging portions of reduced internal diameter substantially fitting the unthreaded portion of a pipe to be connected therewith, and outwardly flared marginal flange portions forming a packing recess, and a separately formed collar member within a portion of greater internal diameter adjacent to said pipe engaging portions, said collar being internally threaded, and fitting in and welded to said sleeve member, an annular packing for engaging said flange portions, a clamping ring therefor, and clamping bolts and nuts, the portion of said sleeve disposed angularly to the axis of said terminal portion, having its terminal portion provided with means for connecting a threaded pipe section thereto.

3. A wrought metal connection for threaded pipes comprising among its members, a wrought metal sleeve member provided adjacent to each end with co-axial pipe engaging portions substantially fitting the unthreaded exterior of the pipe sections to be connected therewith, and marginal outwardly flared flange portions forming a packing recess, said sleeve member having portions of greater internal diameter between said pipe engaging portions, a separately formed internally threaded collar member located within the portion of larger diameter of said sleeve member adjacent to each of said pipe engaging portions and welded to the sleeve member, said sleeve member being provided with a lateral aperture between said collar members, and the branch sleeve member of wrought metal communicating with said lateral aperture, disposed angularly to the axis of the sleeve member, and connected to the sleeve member by welding.

4. A wrought metal connection for threaded pipes comprising among its members, a wrought metal sleeve member provided adjacent to each end with co-axial pipe engaging portions substantially fitting the unthreaded exterior of the pipe sections to be connected therewith, and marginal outwardly flared flange portions forming a packing recess, said sleeve member having portions of greater internal diameter between said pipe engaging portions, a separately formed internally threaded collar member located within the portion of larger diameter of said sleeve member adjacent to each of said pipe engaging portions and welded to the sleeve member, said sleeve member being provided with a lateral aperture between said collar members and the branch sleeve member of wrought metal communicating with said lateral aperture, disposed angularly to the axis of the sleeve member, and connected to the sleeve member by welding, said branch sleeve member being provided at its outer end with threaded portions for connecting a threaded branch pipe section thereto.

5. A wrought metal connection for threaded pipes comprising among its members, a wrought metal sleeve member provided adjacent to each end with co-axial pipe engaging portions substantially fitting the unthreaded exterior of the pipe sections to be connected therewith, and marginal outwardly flared flange portions forming a packing recess, said sleeve member having portions of greater internal diameter between said pipe engaging portions, a separately formed internally threaded collar member located within the portion of larger diameter of said sleeve member adjacent to each of said pipe engaging portions and welded to the sleeve member, said sleeve member being provided with a lateral aperture between said collar members and the branch sleeve member of wrought metal communicating with said lateral aperture, disposed angularly to the axis of the sleeve member, and connected to the sleeve member by welding, said branch sleeve member being provided at its outer end with a pipe engaging portion of reduced internal diameter to substantially fit the unthreaded exterior of a branch pipe section, and having a marginal outwardly flared flange forming a packing recess, and a collar member internally threaded and welded within said branch sleeve member for fitting the threaded end of said branch pipe section.

6. A wrought metal connection for threaded pipes comprising among its members, a wrought metal sleeve member provided adjacent to each end with co-axial pipe engaging portions substantially fitting the unthreaded exterior of the pipe sections to be connected therewith, and marginal outwardly flared flange portions forming a packing recess, said sleeve member having portions, of greater internal diameter between said pipe engaging portions, a separately formed internally threaded collar member located within the portion of larger diameter of said sleeve member adjacent to each of said pipe engaging portions and welded to the sleeve member, said sleeve member being provided with a lateral aperture between said collar members and the branch sleeve member of wrought metal communicating with said lateral aperture, disposed angularly to the axis of the sleeve member, and connected to the sleeve member by welding, said branch sleeve member being provided at its outer end with a pipe engaging portion of reduced internal diameter to substantially fit the unthreaded exterior of a branch pipe section, and having a marginal outwardly flared flange forming a packing recess, and a collar member internally threaded and welded within said branch sleeve member for fitting the threaded end of said branch pipe section, annular packings for engaging the marginal flange portions of said sleeve member and branch sleeve member, a clamping ring for each of said packings, and clamping bolts and nuts for said clamping rings.

7. A wrought metal connection for threaded parts, comprising among its members an integral wrought metal sleeve having a central portion of greater diameter than the external diameter of the pipes to be connected therewith, and a pair of separately formed wrought metal collars having their external diameter such as to fit within the sleeve, said collars being located within the sleeve at separated points adjacent to the end portions thereof, and permanently secured thereto by welding, and each of said collars being interiorly threaded to receive the threaded end of one pipe section.

8. A wrought metal connection for threaded pipes comprising among its members, a sleeve member having a central portion of greater internal diameter than the external diameter of the pipes to be connected therewith, and a pair of separately formed wrought metal collars provided with internal screw threads located within the enlarged portions of the sleeve and welded thereto, to receive the threaded ends of the pipe section, said sleeve being provided at each end with pipe engaging portions of reduced diameter substantially fitting the unthreaded exterior of the pipes to be connected for reinforcing the threaded connections, and relieving them from lateral strains.

9. A wrought metal connection for threaded pipes comprising among its members, a sleeve member having a central portion of greater internal diameter than the external diameter of the pipes to be connected therewith, and a pair of separately formed wrought metal collars provided with internal screw threads located within the enlarged portions of the sleeve and welded thereto, to receive the threaded ends of the pipe sections, said sleeve being provided at each end with pipe engaging portions of reduced diameter substantially fitting the unthreaded exterior of the pipes to be connected for reinforcing the threaded connection, and relieving them from lateral strains, and having marginal outwardly flared portions forming packing recesses between them and the unthreaded exterior of the pipe sections, packing rings engaging said recesses, clamping rings for engaging said packing rings, and clamping bolts and nuts for said clamping rings.

10. A wrought metal connection for threaded pipe sections comprising among its members, a sleeve member provided adjacent to its ends with pipe engaging portions substantially fitting the unthreaded exterior of the pipes to be connected therewith, and marginal outwardly flared flange portions forming packing recesses around the unthreaded portions of the pipe sections, the portions of said sleeve member between the pipe engaging portions being of greater internal diameter, an internally threaded wrought metal collar member engaging the portion of said sleeve of greater diameter adjacent to each of said pipe engaging portions, and permanently welded within said sleeve member, an anchor ring welded to the exterior of said sleeve member adjacent to each of said pipe engaging portions and provided with bolt holes, a packing ring engaging each of said packing recesses, a clamping ring for each of said packing rings provided with bolt holes registering with those in the adjacent anchor ring, and bolts and nuts connecting the adjacent clamping rings and anchor rings.

11. A wrought metal connection for threaded pipe sections comprising among its members, a sleeve member provided adjacent to its ends with pipe engaging portions substantially fitting the unthreaded exterior of the pipes to be connected therewith, and marginal outwardly flared flange portions forming packing recesses around the unthreaded portions of the pipe section, the portions of said sleeve member between the pipe engaging portions being of greater internal diameter, an internally threaded wrought metal collar member engaging the portion of said sleeve of greater diameter adjacent to each of said pipe engaging portions, and permanently welded within said sleeve member, an anchor ring welded to the exterior of said sleeve member adjacent to each of said pipe engaging portions and provided with bolt holes, a packing ring engaging each of said packing recesses, a clamping ring for each of said packing rings provided with bolt holes registering with those in the adjacent anchor ring, and bolts and nuts connecting the adjacent clamping rings and anchor rings, said sleeve member being provided between its said collar members with a laterally extending branch sleeve member provided at its outer end with pipe engaging portions of reduced internal diameter for substantially fitting the unthreaded portion of a branch pipe member, a marginal outwardly flared flange forming a packing recess, and an anchor ring welded to the exterior of the branch sleeve member and provided with bolt holes, a packing ring for the branch sleeve member, a clamping ring for said packing ring provided with bolt holes registering with those in the anchor ring of the branch sleeve member, and bolts and nuts connecting said clamping ring and branch sleeve anchor ring.

In testimony whereof we affix our signatures.

JAMES CLARK.
FRANK N. SMITH.
JAMES MEESE.